L. GAUMONT.
AUTOMATIC CLUTCH RUNNING KINEMATOGRAPHS AND PHONOGRAPHS SYNCHRONOUSLY.
APPLICATION FILED MAR. 14, 1911.
1,074,943.  Patented Oct. 7, 1913.
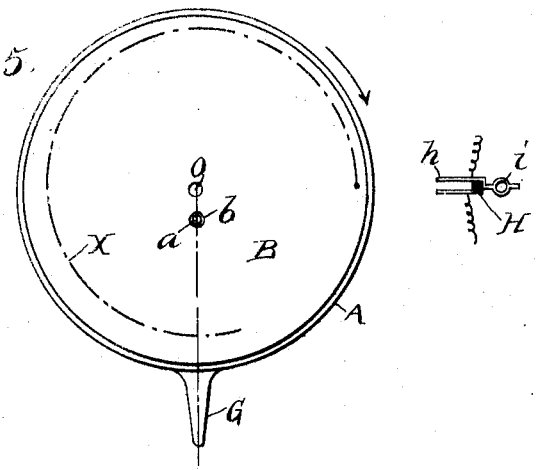
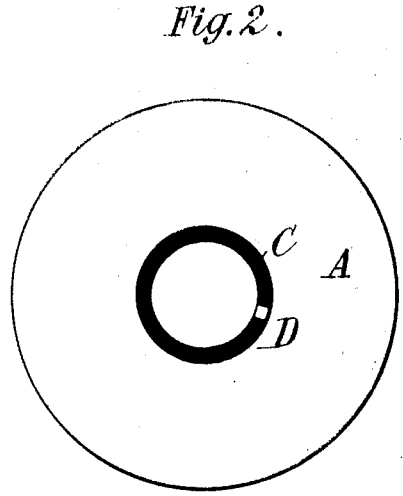
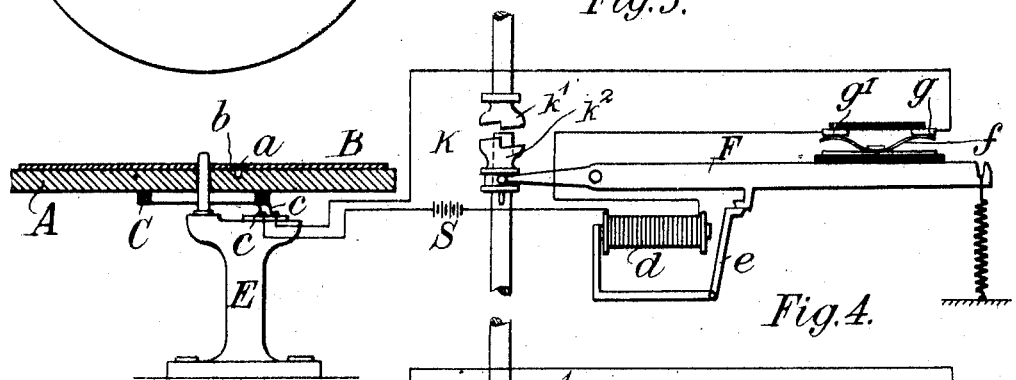
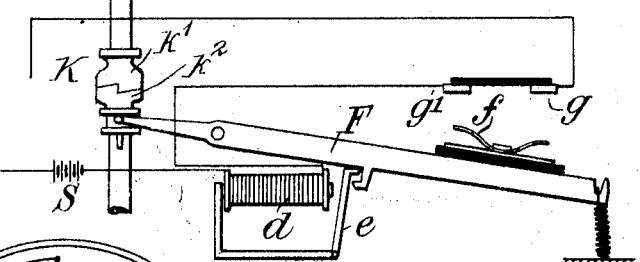
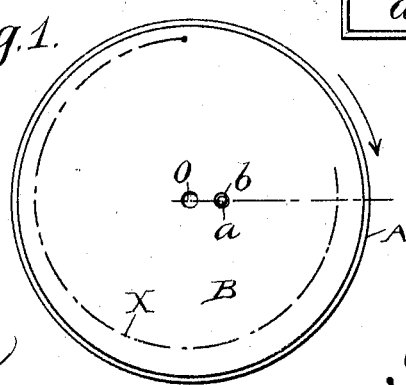
WITNESSES
Fred White
René Bruine
INVENTOR:
Léon Gaumont
By Attorneys,
Fraser, Smith & Myers

UNITED STATES PATENT OFFICE.

LÉON GAUMONT, OF PARIS, FRANCE, ASSIGNOR TO SOCIETE DES ETABLISSEMENTS GAUMONT, OF PARIS, FRANCE.

AUTOMATIC CLUTCH RUNNING KINEMATOGRAPHS AND PHONOGRAPHS SYNCHRONOUSLY.

1,074,943.  Specification of Letters Patent.  Patented Oct. 7, 1913.

Application filed March 14, 1911. Serial No. 614,741.

*To all whom it may concern:*

Be it known that I, LÉON GAUMONT, of Paris, France, have invented certain new and useful Improvements in Automatic Clutches Running Kinematographs and Phonographs Synchronously, of which the following is a specification.

The present invention has for its object a clutch adapted for running a phonograph and a kinematograph synchronously, the construction of the clutch being such that the only guide mark required in the disk is a hole, all the disks of one and the same matrix being perforated at the same point.

This improved clutch will be clearly understood from the following description with reference to the accompanying drawings in which:—

Figure 1 represents a phonograph record disk provided with its guide mark and arranged upon its turn-table. Fig. 2 is an underneath view of the turntable. Fig. 3 shows the clutch device connecting the phonograph and the kinematograph as a whole and ready to operate. Fig. 4 shows the clutch mechanism of the kinematograph only in its normal position. Fig. 5 is a modification of the device provided on the phonograph for clutching it to the kinematograph.

The turntable A of the phonograph carries a projection $a$ which engages with a hole $b$ formed in the disk B. A ring C of insulating material such as fiber, ebonite or the like is secured beneath the plate A; this ring comprises a small metallic sector D.

Two insulated brushes $c$ are fixed to the framework E of the phonograph and bear permanently upon the ring C; it follows that when the turntable A is rotated these two brushes are electrically connected during the passage of the metallic sector D. Now these two brushes are interposed in the circuit of a kinematograph clutch K, comprising members $k'$ and $k^2$ as shown in Fig. 3 wherein $d$ indicates the electromagnet of the clutch, $e$ its armature, and F the clutch lever mechanically connected with the clutch members of the kinematograph. An interrupter is secured to this lever F and is composed of a flexible metallic brush $f$, the ends of which are arranged opposite to two insulated contact pieces $g$ $g'$ secured to the fixed framework of the apparatus. Now if the clutch is cocked, that is to say, ready to operate as indicated in Fig. 3 and the turntable A of the phonograph is started, then when the metallic sector D passes over the brushes $c$ the current from the source of electricity S will pass through the brushes $c$ which are short-circuited by the sector D, then through the contact piece $g$, the brush $f$, the contact piece $g'$ and the electromagnet $d$ which in acting will attract the armature $e$ and release the clutch lever F consequently throwing the parts $k'$ and $k^2$ of the clutch into engagement and starting the kinematograph. When, however, this lever F occupies its normal position (Fig. 4) the brush $f$ will have lost its contact with the fixed contact pieces $g$ and $g'$ and during the following revolutions the current will not pass; this arrangement is adopted in order to prevent heating of the electromagnet $d$.

The electric contact instead of being produced by the contact piece D of the ring C may be produced by any other means such for example as a finger G (Fig. 5) horizontally and rigidly fixed to the periphery of the turntable A, and an external part H. In order that during the following revolutions the finger G or equivalent part such as a cam brush or the like may miss the contact, the part H can be constituted by a rigid strip insulated from a spring $h$, the whole being connected with a hinged support $i$. The finger G first of all comes into contact with the spring H, causes it to touch the rigid strip thus making the clutching contact then in continuing its travel it causes the part H to rock around the hinge pin $i$.

The manner in which the guide mark is formed in the disk B is as follows: As is known an introduction furrow X is formed on the edge of record disks, its pitch being greater than the following furrows in order to facilitate setting the stylus. In order to facilitate the synchronous marking of the disk B and the kinematographic film, the turntable A may be constructed in such a manner that when contact between the contact piece D and the brushes $c$ takes place, the point $o$ which is the center of the disk, the driving projection $a$ and the point $x$ representing the position of the stylus are in one and the same straight line. Under these conditions if the point $x$ of the furrow X corresponding to the datum picture on the Kinematographic film is known and also the contact, it is only necessary to form the hole $b$ on the straight line connecting this point with the center $o$ in order to insure that the clutching shall be produced exactly at the moment at which the stylus passes over the datum mark in the furrow.

What we claim and desire to secure by Letters Patent of the United States is:—

1. In a device of the character described, the combination of a clutch adapted to lock a kinematograph mechanism against operation, and means controlling the operation of said clutch to release said kinematograph mechanism comprising an electric circuit, an electro-magnet in said circuit, and a talking machine having a record carrier and a device upon said carrier for closing said electric circuit.

2. In a device of the character described, the combination of a clutch adapted to lock a kinematograph mechanism against operation, and means controlling the operation of said clutch to release said kinematograph mechanism comprising an electric circuit, an electro-magnet in said circuit, and a talking machine having a record carrier, means upon said carrier for indicating the position for a sound record thereon, and a device upon said carrier for closing said electric circuit.

3. In a device of the character described, the combination of a clutch adapted to lock a kinematograph mechanism against operation, and means controlling the operation of said clutch to release said kinematograph mechanism comprising an electric circuit, an electro-magnet in said circuit, and a talking machine having a record carrier, a sound record upon said carrier, means upon said carrier and sound record for securing a position of said sound record upon said carrier with relation to a particular point upon said sound record, and a device upon said carrier bearing a determined relation to said indicating means for closing said electric circuit.

4. In a device of the character described, the combination of a clutch adapted to lock a kinematographic mechanism against operation and means controlling the operation of said clutch to release said kinematograph mechanism comprising an electric circuit, an electro-magnet in said circuit, and a talking machine having a record carrier and a sound record upon said carrier, and having means for securing a predetermined position of said sound record upon said record carrier, said means being opposite the beginning of the sound undulations of said sound record, and means for closing said electric circuit.

5. In a device of the character described, the combination of a clutch adapted to lock a kinematographic mechanism against operation and means controlling the operation of said clutch to release said kinematograph mechanism comprising an electric circuit, an electro-magnet in said circuit, and a talking machine having a record carrier and a sound record upon said carrier, and having means for securing a predetermined position of said sound record upon said record carrier, and means for closing said electric circuit, said means being opposite the beginning of the sound undulations of said sound-record.

In witness whereof, I have hereunto signed my name in the presence of two subscribing witnesses.

LÉON GAUMONT.

Witnesses:
H. C. COXE,
GABRIEL BELLIARD.